June 17, 1969    J. S. DIXON ET AL    3,450,397
APPARATUS FOR PREPARATION OF HEMISPHERICAL HEAD SEGMENTS
Filed April 24, 1967    Sheet 1 of 3

INVENTOR.
JOHN S. DIXON
JOSEPH W. SMITH
BY
Robert L. Olson
ATTORNEY

INVENTOR.
JOHN S. DIXON
JOSEPH W. SMITH

BY Robert L. Olson
ATTORNEY

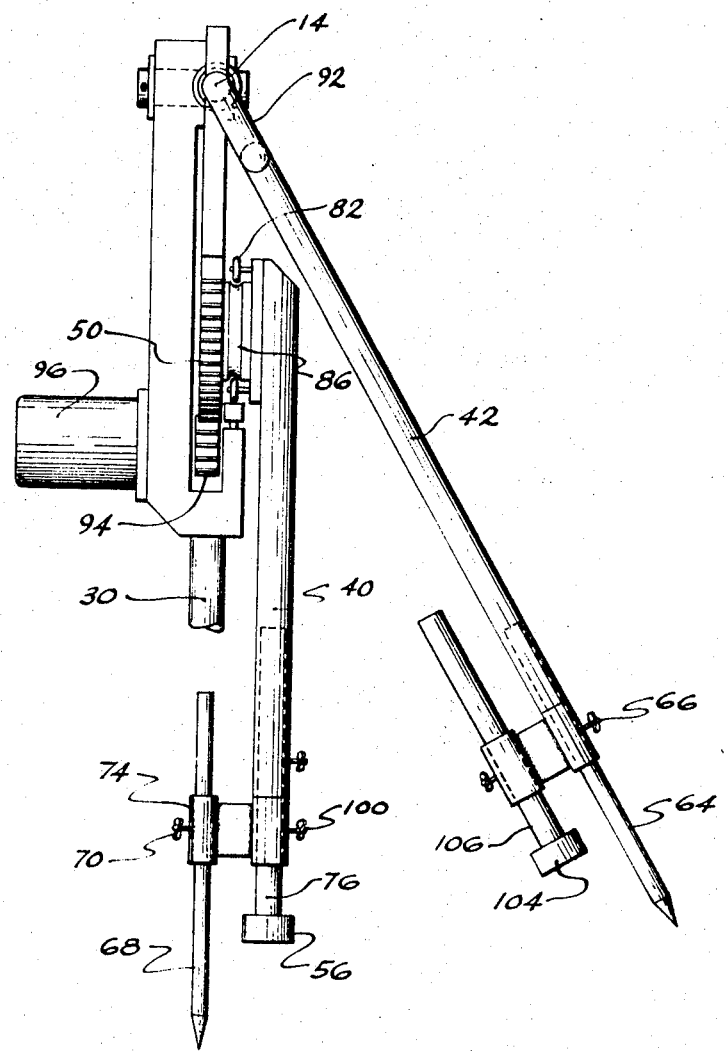

United States Patent Office 3,450,397
Patented June 17, 1969

3,450,397
APPARATUS FOR PREPARATION OF HEMISPHERICAL HEAD SEGMENTS
John S. Dixon, Signal Mountain, and Joseph W. Smith, Chattanooga, Tenn., assignors to Combustion Engineering, Inc., Windsor, Conn., a corporation of Delaware
Filed Apr. 24, 1967, Ser. No. 633,016
Int. Cl. B21d 43/28
U.S. Cl. 266—23                                4 Claims

ABSTRACT OF THE DISCLOSURE

Apparatus including a tripod support arrangement for supporting and accurately positioning of a cutting torch, to be used in cutting to size segments which when welded together will form a hemispherical head.

Background of the invention

The use of large drums and pressure vessels having a hemispherical end portion are required by various industries at the present time. Many of these drums and vessels are of such a size that the hemispherical head cannot be made of one-piece construction. Instead, a number of orange peel sections are manufactured, sized and cut, and then welded together to form the hemispherical head. Problems are encountered in economically and accurately sizing and cutting the edge surfaces of the segments prior to their being welded together.

Summary of the invention

This invention is directed to a tripod support arrangement for supporting and positioning a cutting torch for forming the edge surfaces of segments which when welded together will form a hemispherical head. The arrangement is such that once the tripod has been properly set up on the segment, the cutting of the edge surfaces of the segment can be quickly and automatically accomplished. The legs of the tripod have magnetic means associated therewith, for firmly holding the tripod support in place during the cutting operation.

Brief description of the drawings

FIGURE 4 is a side view of the cutting torch and its support.

Description of the preferred embodiment

Figure 1:
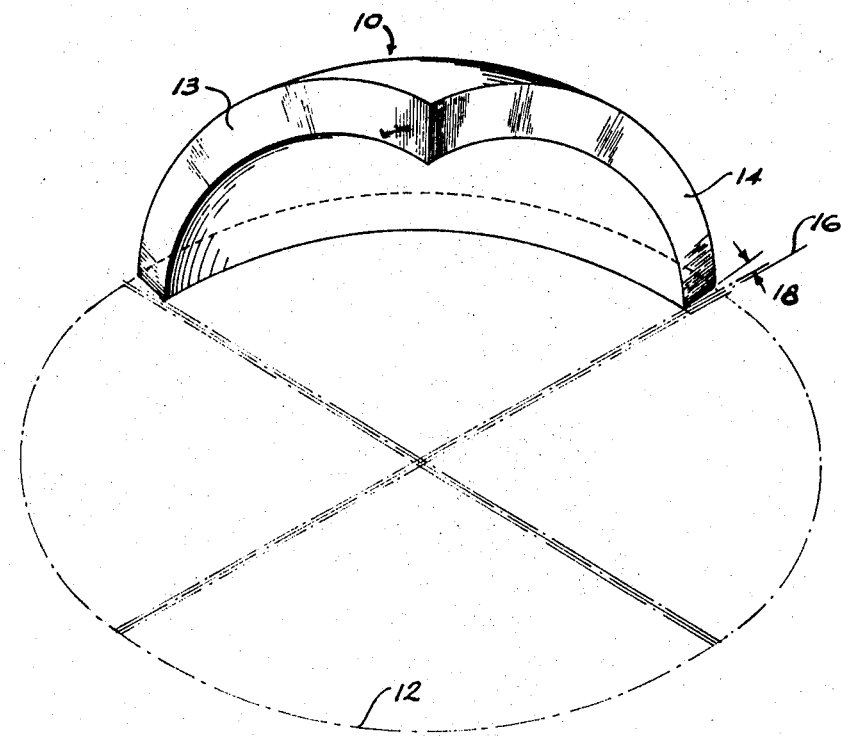
FIGURE 1 is a perspective view of one segment of a hemispherical head laid out on a pattern.

Looking now to FIGURE 1, a quarter segment 10 of a hemispherical head is illustrated. The quarter segment 10 is shown as being situated on a face plate having a circumferential layout line 12. The figure shows the location of the four segments after they have been sized and cut, and are ready to be joined by welding into the finished hemispherical head. As can be seen, the edge surface 13 does not fall exactly on the quarter section line 16 of the finished hemisphere. This is done so that a weld groove having a root width of approximately an inch is possible when the segments are welded together. It is also desirable to have an angled weld groove. Thus, for example, the edge surface 13 may be cut at an angle of 5° to a radius line of the hemisphere as indicated at 18 in FIGURE 1.

Figure 2:
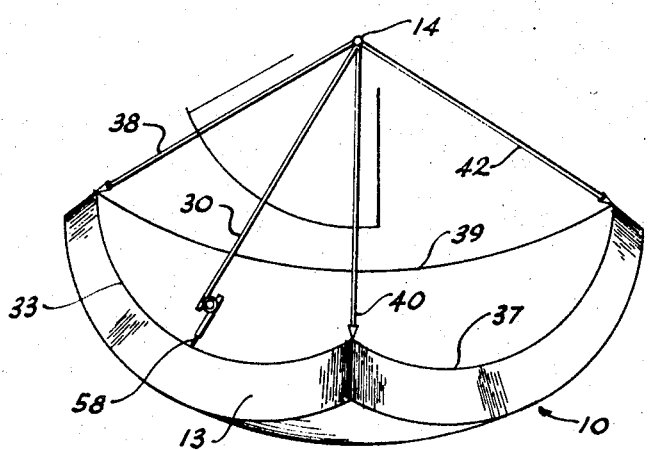
FIGURE 2 is a view showing a cutting torch and its support arrangement in schematic, in position on the segment.

Looking now to FIGURE 2, a metal cutting torch and its support arrangement are shown schematically in position on a segment 10 to be cut into a quarter section of a hemisphere. The tripod support arrangement consists of three legs 38, 40 and 42. Two of the legs 38 and 40 lie in a common plane, and are positioned such that they are located on the layout line 33, along which line the segment is to be cut. The third leg 42 is positioned at an angle sufficiently great from the other two legs so that a firm, sturdy support arrangement for the cutting torch is formed by the tripod. The cutting torch 58 is connected to a leg 30, which leg is rotatable around pivot point 14, so that the cutting torch can be moved along the entire layout line 33, thus accomplishing the desired cut. Pivot point 14 corresponds to the center of curvature of the segment 10, or in other words the center of curvature of the finished hemispherical head.

The location of the pivot point 14 at the center of curvature of the segment 10 is accomplished by adjusting the three legs 38, 40, 42 of the tripod so that they are all of equal length, which length corresponds to the radial length of the segment. Any three radial lines drawn from three points on a curved surface, which three points do not lie in the same plane, will locate the center of curvature of the curved surface at the common point at which they intersect. Thus, if legs 38, 40 and 42 are all adjusted to a length corresponding to the radius of the segment 10, and these legs meet at a common point 14, this point necessarily corresponds to the center of curvature of the segment.

After the edge surface 13 has been cut, the tripod arrangement is picked up and rotated around, with legs 38 and 40 being positioned along layout line 37. When this edge surface has been cut, the tripod is again lifted and positioned so that the cutting torch will cut along layout line 39, thus completing the necessary sizing and cutting of the segment.

Figure 3:
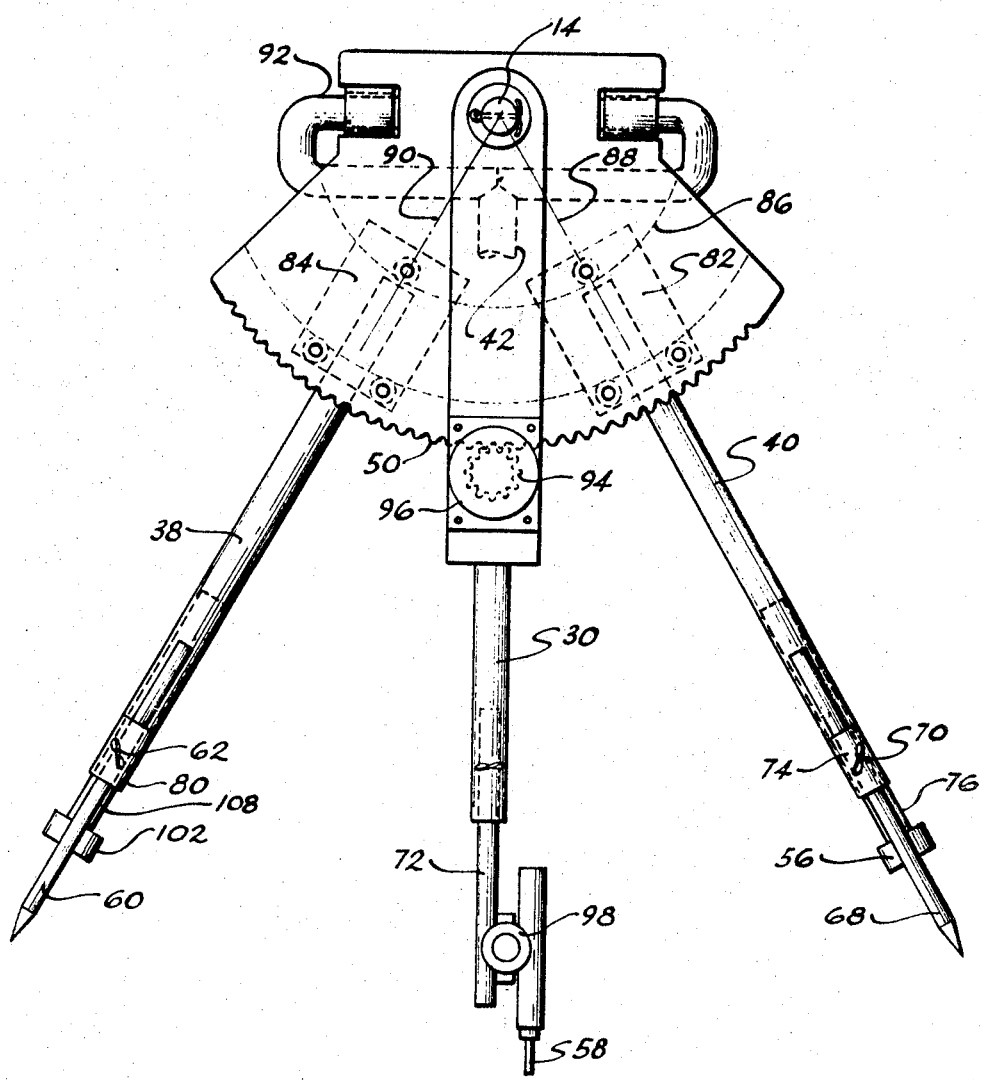
FIGURE 3 is a front view showing the cutting torch and its support arrangement.

Looking now to FIGURES 3 and 4, the construction of the tripod support arrangement and the cutting torch are shown in more detail. As seen in FIGURE 4, leg 40 has an adjustable lower portion 68. Bolt 70 can be loosened and tightened to allow for adjustment of the leg length. This adjustable feature permits the cutting torch and its associated tripod support arrangement to be used for cutting segments of various sized hemispheres. The rear leg 42 (FIGURE 4) also has an adjustable lower leg portion 64, adjustable by loosening and tightening bolt 66. As seen in FIGURE 3, leg 38 has an adjustable leg portion 60, and a bolt 62 also. Leg 30, which carries the cutting torch 58, has an adjustable leg portion 72.

Since it is necessary for the cutting torch 58 to cut an edge surface of the segment along its entire length, there would be interference between the torch and lower leg portions 60 and 68 unless some provision were made to eliminate this problem. As seen in FIGURE 4, lower leg portion 68, including block 74, is rotatably secured to leg 76. Upon loosening bolt 100, leg 68 can be rotated 180°, thereby placing it out of the path of the cutting torch. The lower portion of leg 30, along with the cutting torch 58 is not shown in FIGURE 3, so that the construction of lower leg 68 can be more readily seen. A second extendable leg portion 76, carrying a magnet 56 on the end thereof, is carried by leg 40. Thus, after the tripod and cutting torch has initially been positioned for cutting along one edge of a segment, and before the cutting operation begins, leg 76 carrying magnet 56 is adjusted to place the magnet in contact with the upper surface of the segment. Legs 38 and 42, which also carry extendable magnet legs, are similarly adjusted. After all three of the magnet legs have been lowered, to hold the tripod firmly in place, blocks 74 and 80, along with their associated leg portions, can be removed from the path of cutting torch 58 by rotating them 180°. This will permit the leg 30 carrying the cutting torch 58 to rotate past the tripod legs unimpeded.

Looking to FIGURE 3, legs 38 and 40 are rotatably mounted by means of roller assemblies 82 and 84, on track 86. As shown, extensions 88 and 90 of the center lines of the two legs pass through the pivot point 14. Leg 42, as shown in FIGURE 4, is also pivotable about point 14, by means of yoke support 92. Leg 30, which carries the cutting torch 58, is pivotally secured to pivot point 14. When the cutting operation is to be performed, leg 30 is rotated by means of rack 50, pinion 94, and motor 96. Cutting torch 58 can be of any suitable metal cutting type, for example an oxyacetylene torch.

The angle 18 (FIGURE 1) on the edge surface is accomplished by pivotally mounting the torch 58 on its carrying leg, shown at 98 in FIGURE 3. The torch 58 can thus be adjusted to cut the segment at any angle to a radial line that is desired.

The operation of the device should now be apparent. First, layout lines 33, 37 and 39 along which the segment is to be cut, are made on the segment. The segment is then placed in the FIGURE 2 position, with the lower pointhed leg portions 60 and 68 coinciding with the layout line 33. All three legs 38, 40 and 42 of the tripod are made equal length to point 14, which length is the radical length of the segment. This fixes point 14 at the center of curvature of the segment. The cutting torch is set at the proper angle, and also set to cut along the layout line. The magnets 56, 102 and 104 are then lowered into position, and leg portions 60 and 68 are rotated out of the path of the cutting torch. The cutting torch is then positioned at one end of the layout line, and rotated to the other end by means of motor 96, thereby forming the desired edge surface 13 on the segment.

It is not necessary that the plane in which the cutting torch rotates coincide with the plane in which legs 38 and 40 are rotatable. However, in order to have the tripod form a firm support these two planes should lie close together. If the segment to be cut is made of non-magnetic material, then something other than magnets would have to be used to hold the tripod in place. For example, legs 76, 106 and 108 might just have pointed ends, as is the case of removable legs 60 and 68.

What we claim is:

1. Apparatus for the preparation of edge surfaces of a curved metallic member which when welded together with other similar members will form a hemispherical head comprising, a tripod support arrangement which rests on the upper surface of the member, having three equal length legs, the three legs being located such that they themselves or projections thereof all meet at a common point, which point corresponds to the center of curvature of the member, a fourth leg supported by the tripod, said fourth leg being rotatable about the point in a plane which passes through the point, said fourth leg having cutting means connected thereto, and driving means for causing the fourth leg and the cutting means to rotate, thus cutting a straight edge on the metallic member.

2. The apparatus set forth in claim 1, wherein the cutting means is pivotally connected to the fourth leg, so that it can be rotated in a plane other than the plane of rotation of the fourth leg.

3. The apparatus set forth in claim 1, wherein the legs of the tripod have adjustably magnetic means associated therewith, which magnetic means can be adjusted so as to be placed in contact with the metallic member, thereby firmly holding the tripod support arrangement in place during the cutting operation.

4. Apparatus for the preparation of edge surfaces of a curved metallic member which when welded together with other similar members will form a hemispherical head comprising, a tripod support arrangement which rests on the upper surface of the member, said tripod having three equal length legs which rotate around a common point, which point corresponds to the center of curvature of the member, first and second of the legs being movable about the point in a first plane, the third leg being movable around the point in a second plane, a fourth leg supported by the tripod, said fourth leg being rotatable in a plane, about the point, said fourth leg having cutting means connected thereto, and driving means for causing the fourth leg and the cutting means to rotate, thus cutting a straight edge on the metallic member.

References Cited

UNITED STATES PATENTS

| 2,474,149 | 6/1949 | Hume | 266—23 |
| 2,939,360 | 6/1960 | Carten | 248—431 X |
| 3,246,398 | 4/1966 | Gierlich | 33—21 |

FOREIGN PATENTS 224,805  10/1959  Australia.

J. SPENCER OVERHOLSER, *Primary Examiner.*

R. D. BALDWIN, *Assistant Examiner.*

U.S. Cl. X.R.

33—21; 248—431